(12) United States Patent
Chiu et al.

(10) Patent No.: US 8,525,497 B2
(45) Date of Patent: Sep. 3, 2013

(54) USING OFFSET CANCELLATION CIRCUIT TO MITIGATE BEAT-FREQUENCY OSCILLATION OF PHASE CURRENTS IN A MULTIPHASE INTERLEAVED VOLTAGE REGULATOR

(75) Inventors: Chen-Hua Chiu, New Taipei (TW); Ching-Jan Chen, Taipei (TW); Dan Chen, Taipei (TW); Wei-Hsu Chang, Jubei (TW)

(73) Assignee: Rickhtek Tecnology Corp., Hsinchu (TW)

( * ) Notice: Subject to any disclaimer, the term of this patent is extended or adjusted under 35 U.S.C. 154(b) by 446 days.

(21) Appl. No.: 13/018,628

(22) Filed: Feb. 1, 2011

(65) Prior Publication Data

US 2011/0187341 A1 Aug. 4, 2011

(30) Foreign Application Priority Data

Feb. 4, 2010 (TW) .............................. 99103356 A

(51) Int. Cl.
*G05F 1/59* (2006.01)
(52) U.S. Cl.
USPC ......................................... 323/272; 323/285

(58) Field of Classification Search
USPC ........................................ 323/272, 282, 285
See application file for complete search history.

(56) References Cited

U.S. PATENT DOCUMENTS

| | | | | |
|---|---|---|---|---|
| 6,605,931 B2 * | 8/2003 | Brooks | | 323/272 |
| 6,650,096 B2 * | 11/2003 | Lee | | 323/272 |
| 7,098,728 B1 * | 8/2006 | Mei et al. | | 327/538 |
| 7,777,462 B2 * | 8/2010 | Kudo et al. | | 323/272 |
| 7,782,031 B2 * | 8/2010 | Qiu et al. | | 323/272 |
| 8,030,911 B2 * | 10/2011 | Nien et al. | | 323/283 |
| 2010/0109622 A1 * | 5/2010 | Miki et al. | | 323/272 |
| 2011/0057632 A1 * | 3/2011 | Cheng et al. | | 323/234 |
| 2011/0084673 A1 * | 4/2011 | Chang et al. | | 323/271 |
| 2011/0187341 A1 * | 8/2011 | Chiu et al. | | 323/285 |

* cited by examiner

*Primary Examiner* — Jeffrey Sterrett
(74) *Attorney, Agent, or Firm* — Rosenberg, Klein & Lee

(57) ABSTRACT

For a multiphase interleaved voltage regulator, an offset cancellation circuit is applied for each phase separately. The current loop gain of each phase is thus increased to mitigate the beat-frequency oscillation in phase currents when the beat frequency is below the bandwidth of the low-pass filter in the offset cancellation circuit, without introducing additional instability issue that is the drawback of increasing current-sensing gain.

9 Claims, 10 Drawing Sheets

USING OFFSET CANCELLATION CIRCUIT TO MITIGATE BEAT-FREQUENCY OSCILLATION OF PHASE CURRENTS IN A MULTIPHASE INTERLEAVED VOLTAGE REGULATOR

FIELD OF THE INVENTION

The present invention is related generally to a multiphase interleaved voltage regulator and, more particularly, to mitigation of beat-frequency oscillation of phase currents in a multiphase interleaved voltage regulator.

BACKGROUND OF THE INVENTION

References

[1] U.S. Pat. No. 6,683,441.
[2] U.S. Pat. No. 6,144,194.
[3] J. Sun, Q. Yang, M. Xu, F. C. Lee, "High-frequency dynamic current sharing analyses for multiphase buck VRs," IEEE Trans. Power Electronics, vol. 22, no. 6, pp. 2424-2431, November 2007.
[4] C.-J. Chen, D. Chen, M. Lee, E. K.-L. Tseng, "Design and modeling of a novel high-gain peak current control scheme to achieve adaptive voltage positioning for DC power converters," in Proc. IEEE Power Electronics Specialists Conference, 2008, pp. 3284-3290.
[5] U.S. Pat. No. 7,436,158.

The multiphase interleaved voltage regulator is a popular topology for point-of-load (PoL) applications [1-2]. However, when loading represents high-frequency dynamic changing, this topology suffers from the problem of beat-frequency oscillation in phase currents. This phenomenon is depicted in FIG. 1, taking a two-phase interleaved voltage regulator as an example. Under high-frequency variation of load current Iload, two phase currents IL1 and IL2 represent a beat-frequency oscillation. The beat frequency is the difference between the sampling frequency (switching frequency) $\omega_{sw}$ of the pulse-width modulator and the load changing frequency $\omega_{load}$, i.e.

$$\omega_{beat} = \omega_{sw} - \omega_{load}. \quad [\text{Eq-1}]$$

The oscillation causes large current amplitude which hurts efficiency and may even destroy the main semiconductor switches. For peak-current mode controlled voltage regulators, it is reported in [3] that increasing current sensing gain can reduce this problem. However, increasing current-sensing gain may leads to instability of the voltage regulator. Moreover, in some applications, adaptive voltage positioning (AVP) is required. In this case, the current-sensing gain is decided by the specification of loading if an optimal AVP design is required.

Peak current-mode control (PCC) offers unique features of easy phase-current balancing and cycle-to-cycle current protection but suffers from the disadvantages of output voltage direct-current (DC) offset and poor line regulation when used to achieve AVP. The over-riding design consideration to achieve AVP is to have constant converter output impedance, and as a result of this design constraint, the low frequency voltage loop gain of a PCC regulator is inevitably low which leads to poor output-voltage DC error and line regulation [4]. In [5], an offset cancellation circuit is proposed to the low-gain current-mode control which is used in applications with AVP function. However, the circuit also suffers from the problem of beat-frequency oscillation at high-frequency dynamic load change.

FIG. 2 is a circuit diagram of a two-phase interleaved voltage regulator with PCC. The phase 1 includes switches S1, S2 and an inductor L1, and the phase 2 includes switches S3, S4 and an inductor L2. The switches S2 and S4 can be replaced by diodes if synchronous rectifying is not needed. IL1 and IL2 represent the phase currents of the phases 1 and 2, respectively. Current sensors 10 and 12 have respective gains indicated by Ri, and Hv stands for the gain of a compensator 14 in the voltage-control loop. Pulse-width modulators 16 and 18 perform current mode control in response to current sense signals IS1 and IS2, respectively, and a compensation signal Vc provided by the compensator 14. For an n-phase interleaved voltage regulator, there would be the circuits of n phases connected in parallel between the input terminal 22 and output terminal 24 of the voltage regulator.

FIG. 3 is a circuit diagram of [5], which adds an offset cancellation circuit 26 for modifying the compensation signal Vc of an n-phase interleaved voltage regulator with PCC. In the offset cancellation circuit 26, an adder 28 sums up all of the current sense signals IS1-ISn to obtain a total current sense signal Isum, a divider 30 divides the total current sense signal Isum by the number of the phases n to obtain an average current sense signal Iavg, an adder 32 subtracts the average current sense signal Iavg from the modified compensation signal V'c to obtain a difference signal LI, a low-pass filter 34 filters the difference signal LI to generate an offset signal LO, and an adder 36 adds the offset signal LO into the compensation signal Vc and subtracts a bias ID therefrom to generate the modified compensation signal V'c that replaces the original compensation signal Vc to be provided for the pulse-width modulators 16-38 of all the phases. For multiphase applications, the offset cancellation circuit 26 is applied once for all phases, and the low-pass filter 34 is used to eliminate the DC offset of the output voltage Vo.

Based on small-signal analysis, the offset cancellation circuit 26 offers boosting in loop gains below the bandwidth of the low-pass filter 34 [4]. It is reported in [3] that the higher loop gain in each phase's current loop at beat-frequency suppresses the beating oscillation. Therefore, since the offset cancellation circuit 26 results in boosted loop gain, it can be used for mitigation of beat-frequency oscillation in phase currents. However, in [5], based on the analysis below, it can not retain the advantage of mitigation of beat-frequency oscillation.

The model for analyzing beat-frequency oscillation in phase currents is shown in FIG. 4 for peak-current mode, in which $ZOC(\omega_{load})$ represents the closed-loop output impedance of the voltage regulator, $Hv(\omega_{load})$ represents the transfer function of the compensator 14, Fm represents the gain of the pulse-width modulator 16, D represents the steady-state value of the duty cycle, $G'id(\omega_{beat})$ represents the transfer function of the beat-frequency duty cycle of the power stage (i.e. the switches S1, S2 and the inductor L1) to the phase currents, $He(\omega_{beat})$ represents the sample-and-hold effect of the current loop, block 40 is the $\omega_{beat}$ component of the phase 1, and the beat-frequency oscillation has a susceptibility $$\frac{IL1(\omega_{beat})}{Iload(\omega_{load})} = \frac{Zoc(\omega_{load}) \cdot Hv(\omega_{load}) \cdot Fm \cdot e^{j \cdot D \cdot 2\pi} \cdot G'id(\omega_{beat})}{1 + G'id(\omega_{beat}) \cdot Ri \cdot He(\omega_{beat}) \cdot Fm} \quad [\text{Eq-2}]$$

$$\equiv \frac{G(\omega_{load}, \omega_{beat})}{1 + T'i(\omega_{beat})},$$

where $G(\omega_{load}, \omega_{beat})$ is the susceptibility without any current loop, and $T'i(\omega_{beat})$ is the current loop gain of each phase. In FIG. 3, the offset cancellation circuit 26 sums up the current sense signals IS1-ISn of all the phases and therefore, due to the phase shift among the phase currents IL1-ILn, the sum of their beat-frequency components will be zero, and thereby the transfer function GF(ω) of the low-pass filter 34 does not appear in T'i($\omega_{beat}$). In other words, in the conventional approach, the offset cancellation circuit 26 brings no effect to beat-frequency oscillation of the phase currents.

SUMMARY OF THE INVENTION

An object of the present invention is directed to mitigation of beat-frequency oscillation of phase currents in a multiphase interleaved voltage regulator.

According to the present invention, in a multiphase interleaved voltage regulator, an offset cancellation circuit is applied for each phase separately to increase the phase's current loop gain. Specifically, the offset cancellation circuit includes a low-pass filter, and when beat frequency is lower than the bandwidth of the low-pass filter, the beat-frequency oscillation of the phase currents is mitigated. Moreover, using this technique to mitigate the problem of beat-frequency oscillation does not introduce additional instability issue, which is the drawback of increasing current sensing gain.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
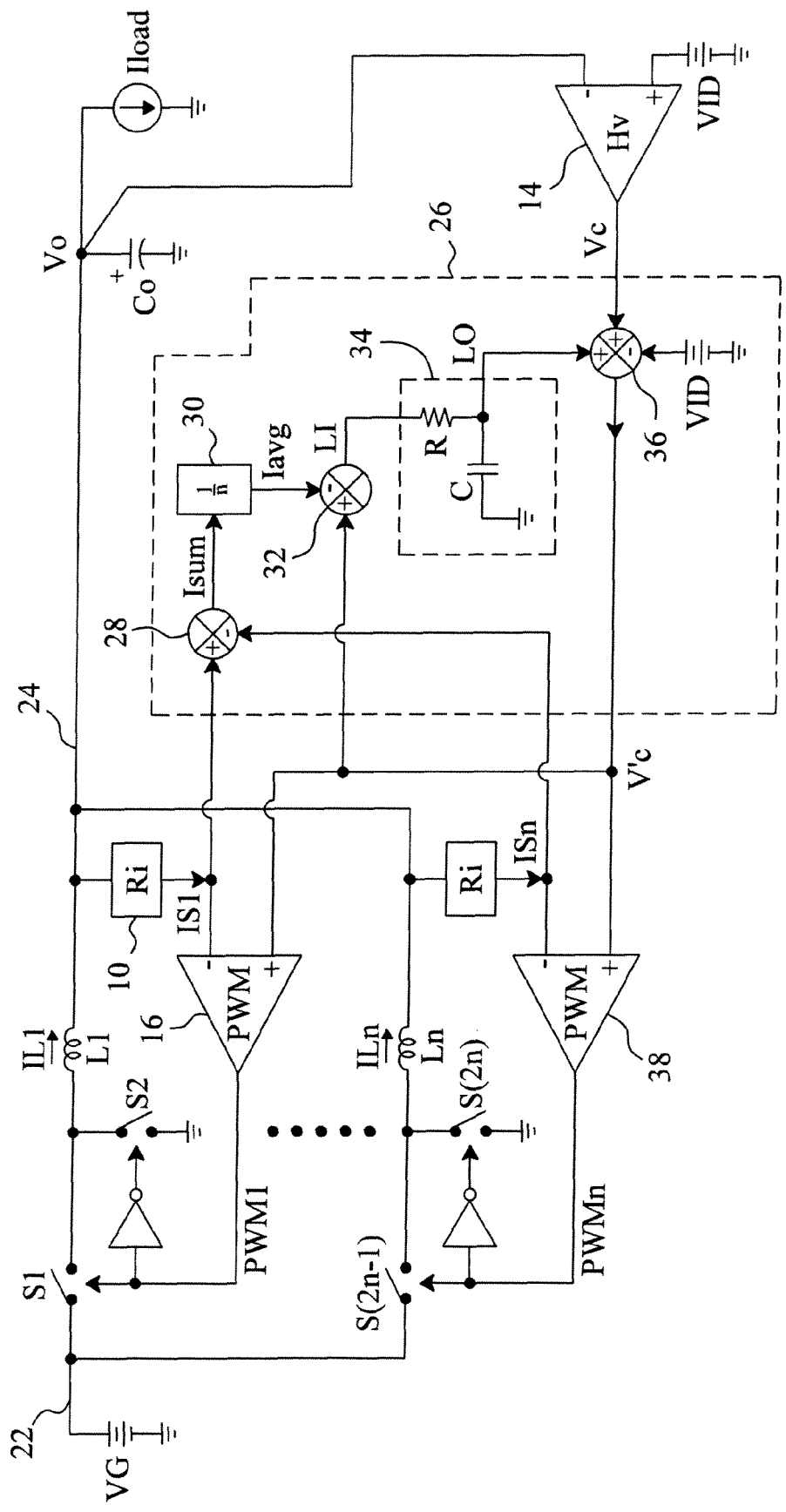
FIG. 3 is a circuit diagram of an n-phase interleaved voltage regulator having an offset cancellation circuit.
Figure 5:
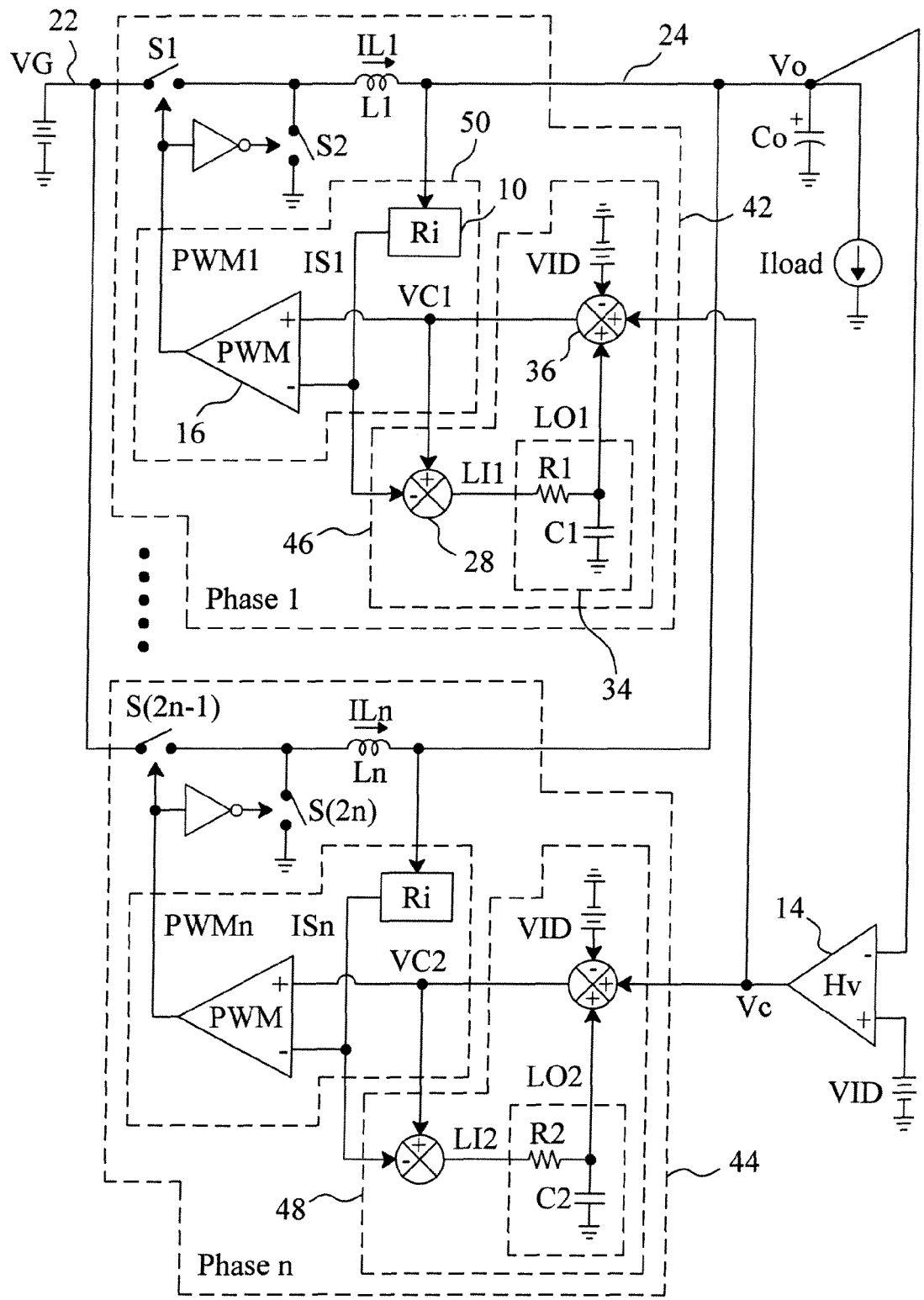
FIG. 5 is a circuit diagram of an embodiment according to the present invention.

For the sake of easy comparison between the present invention and the conventional approach, FIG. 5 provides an embodiment according to the present invention designed based on the same n-phase interleaved voltage regulator of FIG. 3, in which, however, offset cancellation circuit is applied to each phase separately. Likewise, this voltage regulator includes an input terminal 22 for receiving an input voltage VG, an output terminal 24 for providing a regulated output voltage Vo, and n phase circuits 42-44 connected in parallel between the input terminal 22 and the output terminal 24 for generating a plurality of phase-interleaved currents IL1-ILn. Specifically, each of the phase circuits 42-44 has an individual offset cancellation circuit to increase the current loop gain of the phase itself, for example, an offset cancellation circuit 46 for the phase circuit 42 and an offset cancellation circuit 48 for the phase circuit 44. The same as that of FIG. 3, in this embodiment, a compensator 14 generates a compensation signal Vc proportional to the difference between the output voltage Vo and a reference voltage VID for all the phase circuits 42-44, and each of the phase circuits 42-44 has a control circuit for current mode control. For example, the phase circuit 42 has a control circuit 50 that includes a pulse-width modulator 16 to generate a pulse-width modulation signal PWM1 in response to the compensation signal Vc and the phase current IL1 of the phase circuit 42. The low-side switches S2-S(2n) can be replaced by diodes if synchronous rectifying is not needed. In the phase circuit 42, the compensation signal Vc is modified by the offset cancellation circuit 46 before it is provided to the pulse-width modulator 16. In the offset cancellation circuit 46, an adder 28 subtracts the current sense signal IS1 representative of the phase current IL1 from the modified compensation signal VC1 to generate a difference signal LI1, a low-pass filter 34 filters the difference signal LI1 to generate an offset signal LO1, and an adder 36 adds the offset signal LO1 into the compensation signal Vc and subtracts a bias VID therefrom to generate the modified compensation signal VC1. In other words, the offset signal LO1 is generated in response to the current sense signal IS1 and the compensation signal Vc, and is injected into the pulse-width modulator 16. Since the current sense signal IS1 has the beat-frequency oscillation component, the offset signal LO1 also has the beat-frequency oscillation component. Therefore, the offset signal LO1 injected into the pulse-width modulator 16 will affect the phase current IL1 in terms of beat-frequency oscillation.

Figure 6:
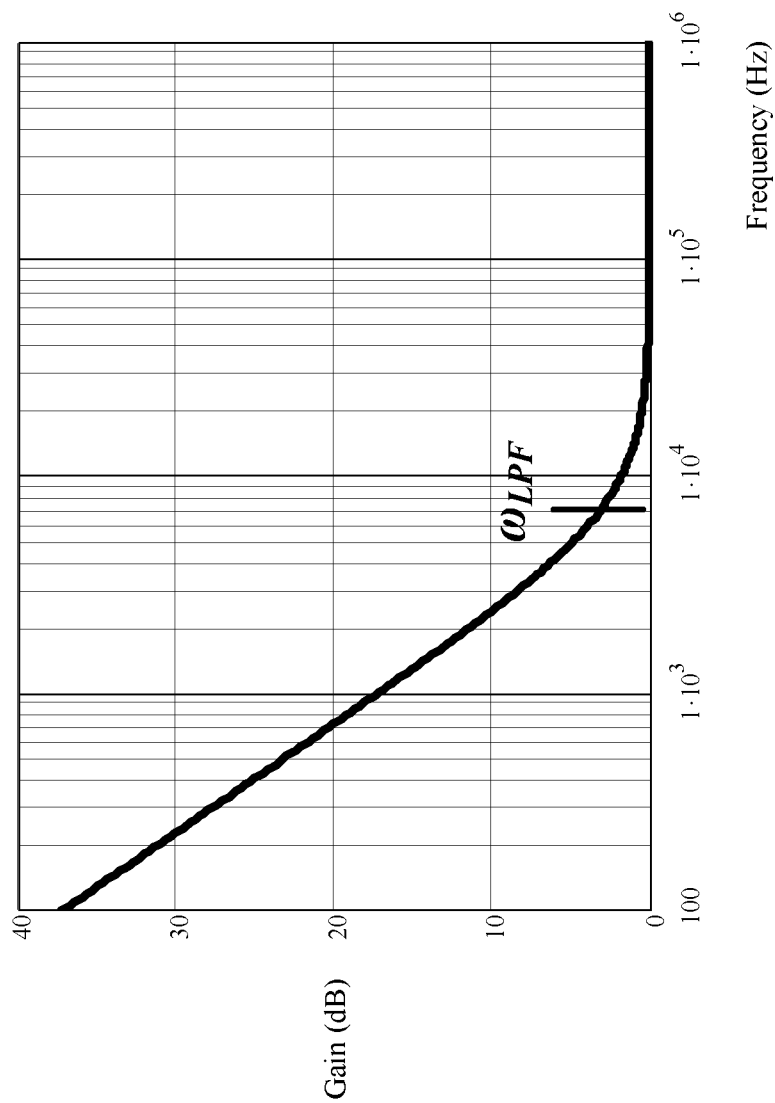
FIG. 6 is the frequency response of the offset cancellation circuit shown in FIG. 5.

A typical frequency response of the offset cancellation circuit 46 is shown in FIG. 6, in which $\omega_{LPF}$ is the bandwidth of the low-pass filter 34. The gain of the offset cancellation circuit 46 is greater than one below $\omega_{LPF}$, and equal to one above $\omega_{LPF}$. Thus, the current loop gain of the phase circuit 42 increases below $\omega_{LPF}$ and thereby mitigates beat-frequency oscillation of the phase current IL1. Nevertheless, since there is no increase in the current-sensing gain Ri, the risk of instability can be eliminated.

Figure 4:
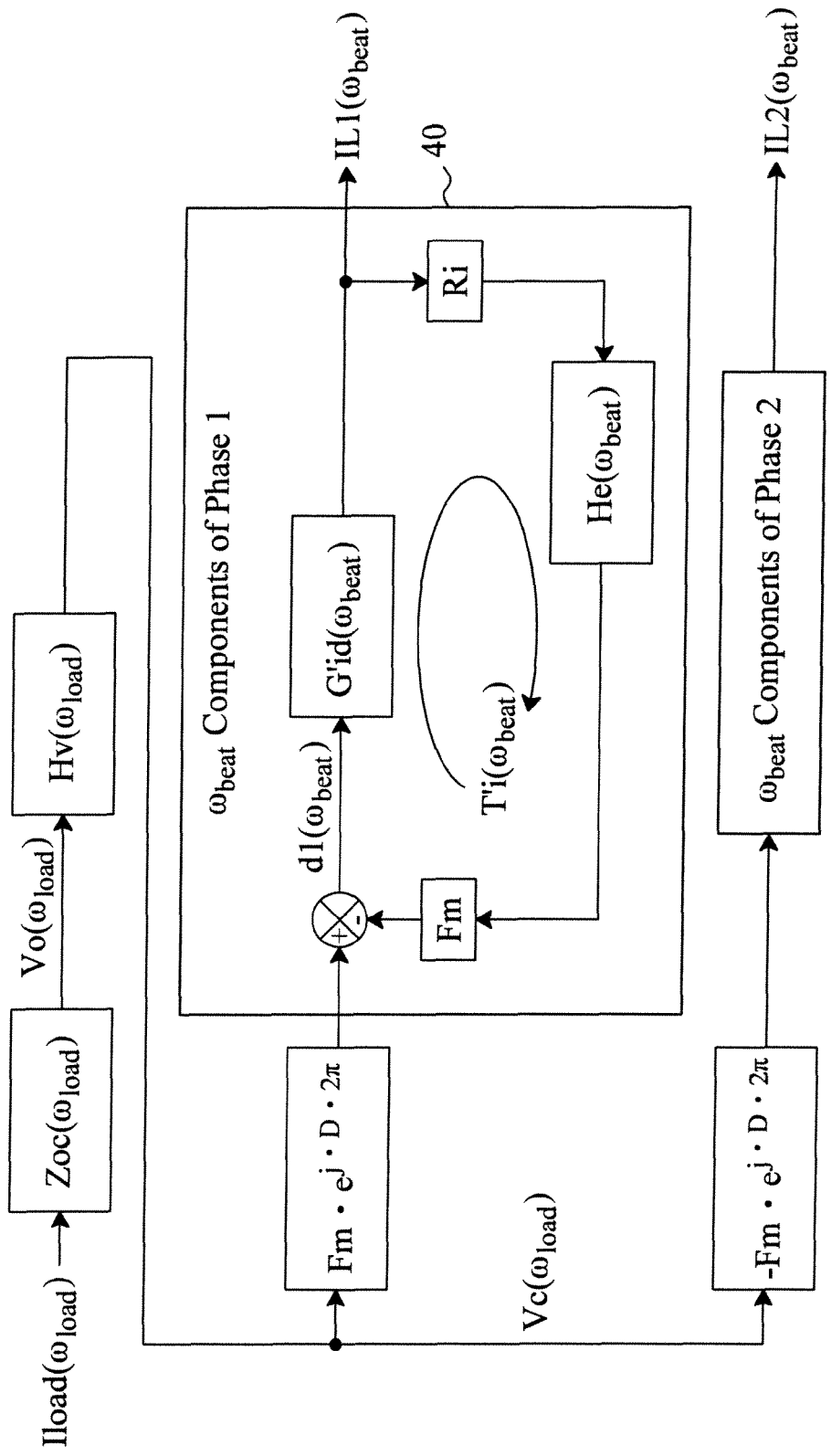
FIG. 4 is a model for analyzing beat-frequency oscillation in phase currents of the circuit shown in FIG. 2.
Figure 7:
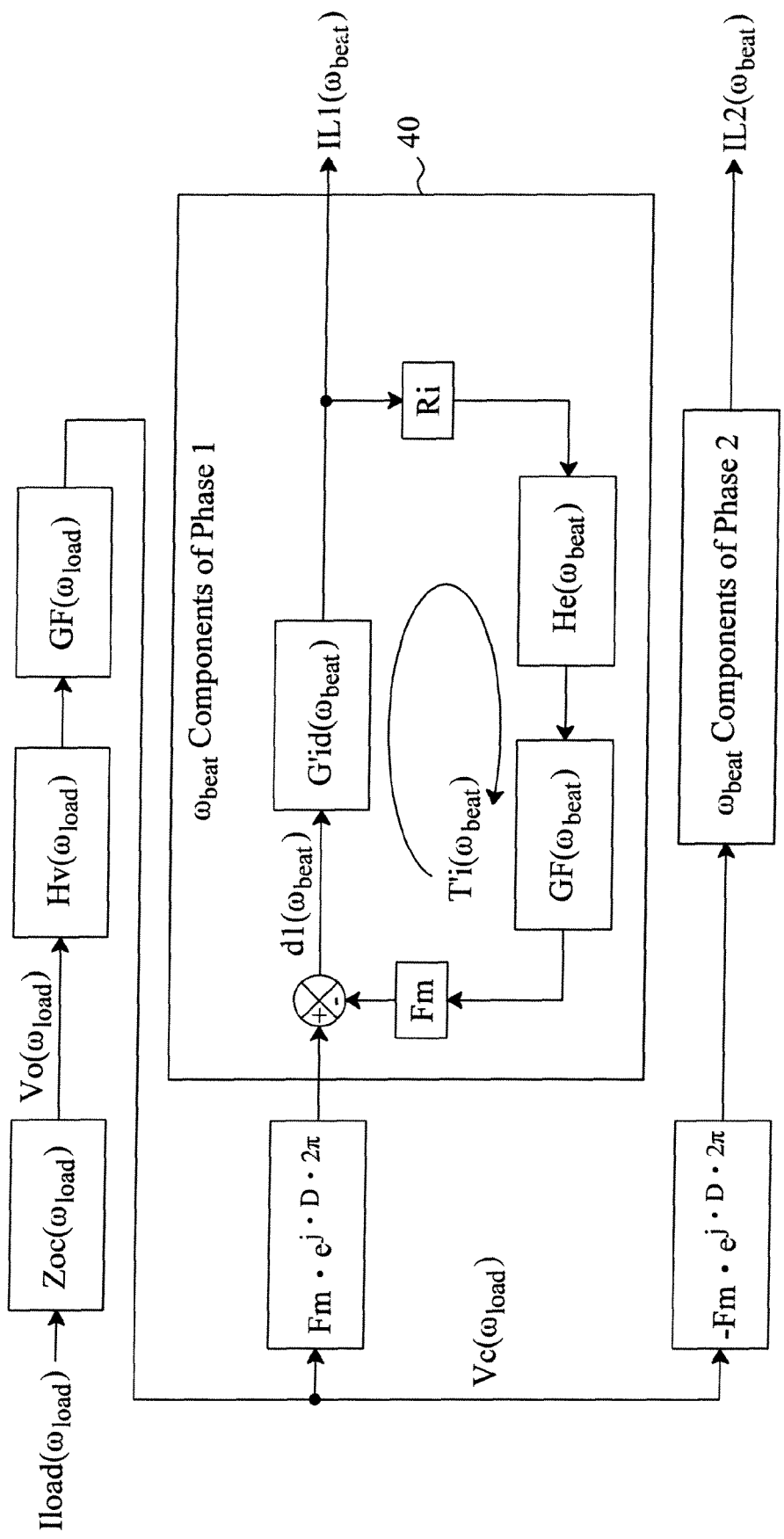
FIG. 7 is a model for analyzing beat-frequency oscillation in phase currents of the circuit shown in FIG. 5.

FIG. 7 is a small-signal model similar to that of FIG. 4, which includes a transfer function GF(ω) of the low-pass filter 34, and whose beat-frequency oscillation has the susceptibility $$\frac{IL1(\omega_{beat})}{Iload(\omega_{load})} = \frac{Zoc(\omega_{load}) \cdot Hv(\omega_{load}) \cdot GF(\omega_{load}) \cdot Fm \cdot e^{j \cdot D \cdot 2\pi} \cdot G'id(\omega_{beat})}{1 + G'id(\omega_{beat}) \cdot Ri \cdot He(\omega_{beat}) \cdot Fm \cdot GF(\omega_{beat})} \quad [Eq\text{-}3]$$

$$\equiv \frac{G(\omega_{load}, \omega_{beat})}{1 + T'i(\omega_{beat})},$$

wherein GF($\omega_{load}$) approximates one and GF($\omega_{beat}$) is greater than one. Comparing FIG. 7 with FIG. 4, the main difference is the appearance of the GF($\omega_{beat}$) block in FIG. 7, which is the gain of the offset cancellation circuit 46 and increases the current loop gain T'i($\omega_{beat}$) of the phase current IL1 thereby mitigating the beat-frequency oscillation of the phase current IL1.

Figure 8:
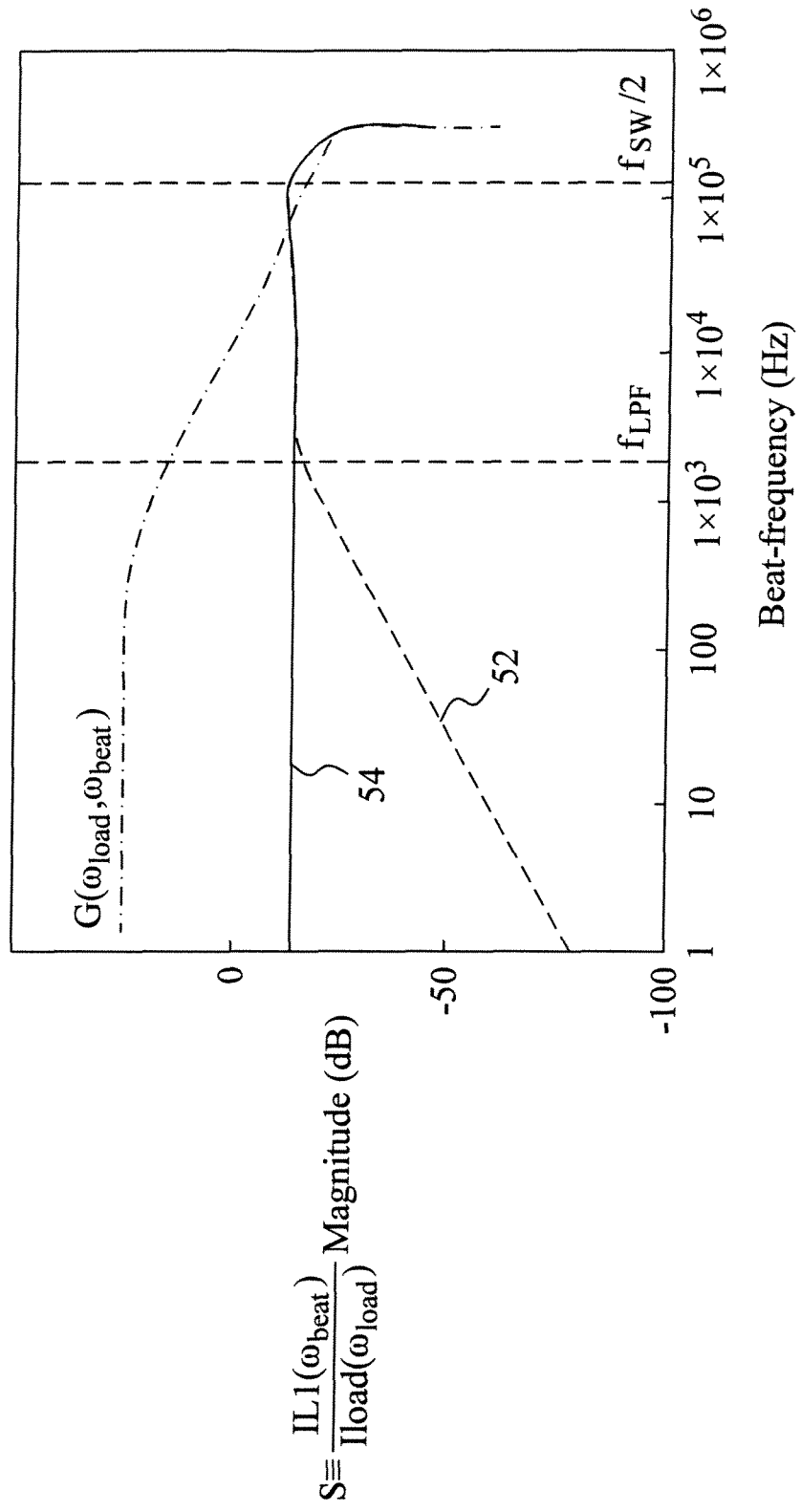
FIG. 8 is the calculation result of using the model of FIG. 7 to analyze the beat-frequency oscillation in phase currents of the circuit shown in FIG. 5.

The calculation result of using the model of FIG. 7 to analyze the beat-frequency oscillation in phase currents is shown in FIG. 8, in which curve 52 represents the susceptibility $IL1(\omega_{beat})/Iload(\omega_{load})$ to the beat-frequency oscillation in phase currents of the circuit shown in FIG. 5, and curve 54 represents the susceptibility without the offset cancellation circuit 46 for comparison. Because of the $GF(\omega_{beat})$ shown in the model of FIG. 7, the susceptibility to the beat-frequency oscillation in phase currents is suppressed by the magnitude of $GF(\omega_{beat})$ in low beat frequency, compared with the conventional peak-current mode control. For the conventional voltage regulator of FIG. 3, the offset cancellation circuit 26 takes the sum of all the phase currents IL1-ILn for modifying the compensation signal Vc. Since each phase current has a phase shift, the sum of the beating frequency components will be zero. Therefore, the transfer function $GF(\omega)$ of the offset cancellation circuit 26 will not appear in the current loop gain $Ti(\omega_{beat})$ of each phase, and the advantage as in the present invention can not be obtained.

Figure 1:
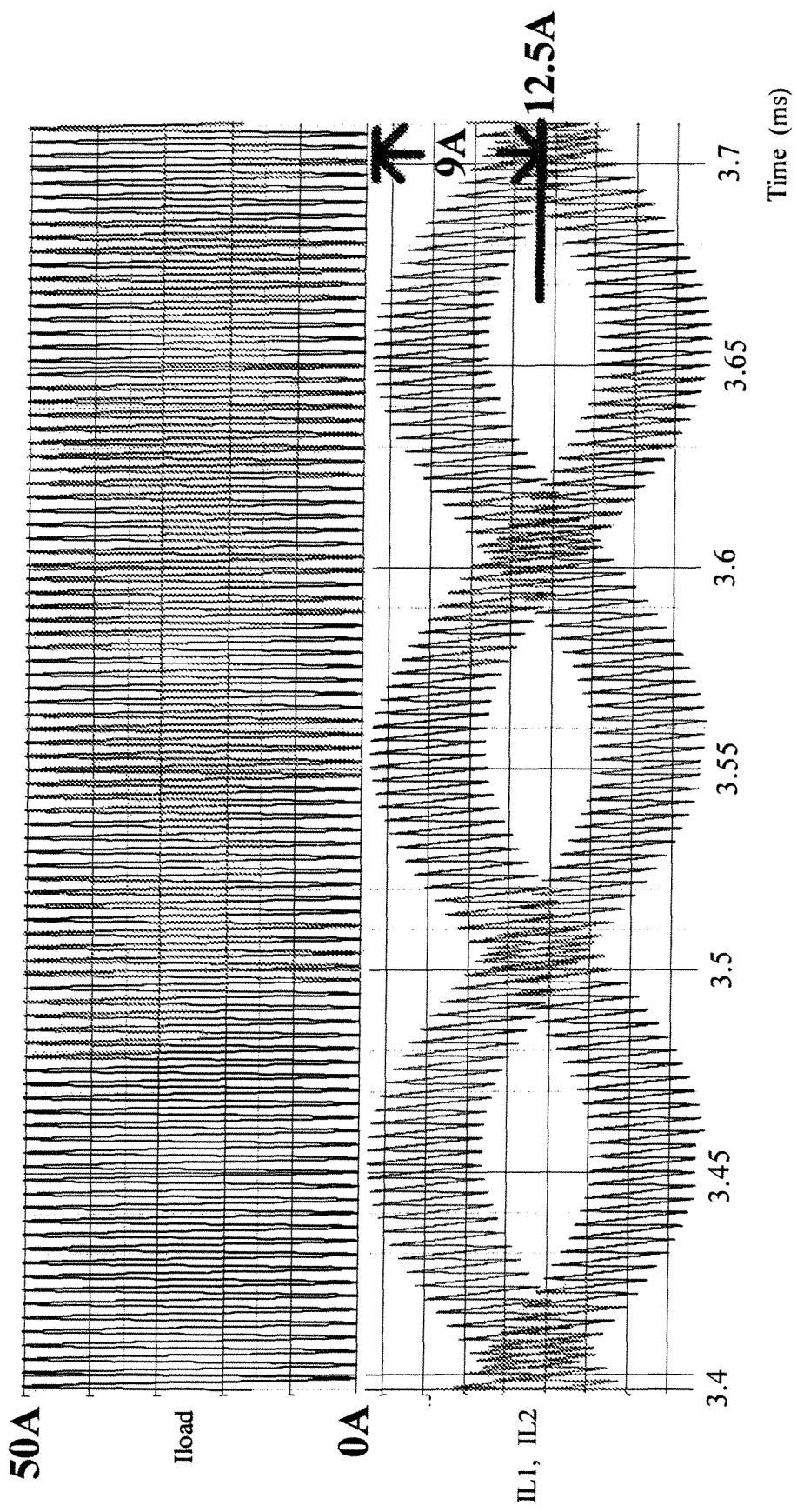
FIG. 1 is a waveform diagram of a load current and corresponding phase currents in a conventional two-phase interleaved voltage regulator.
Figure 2:
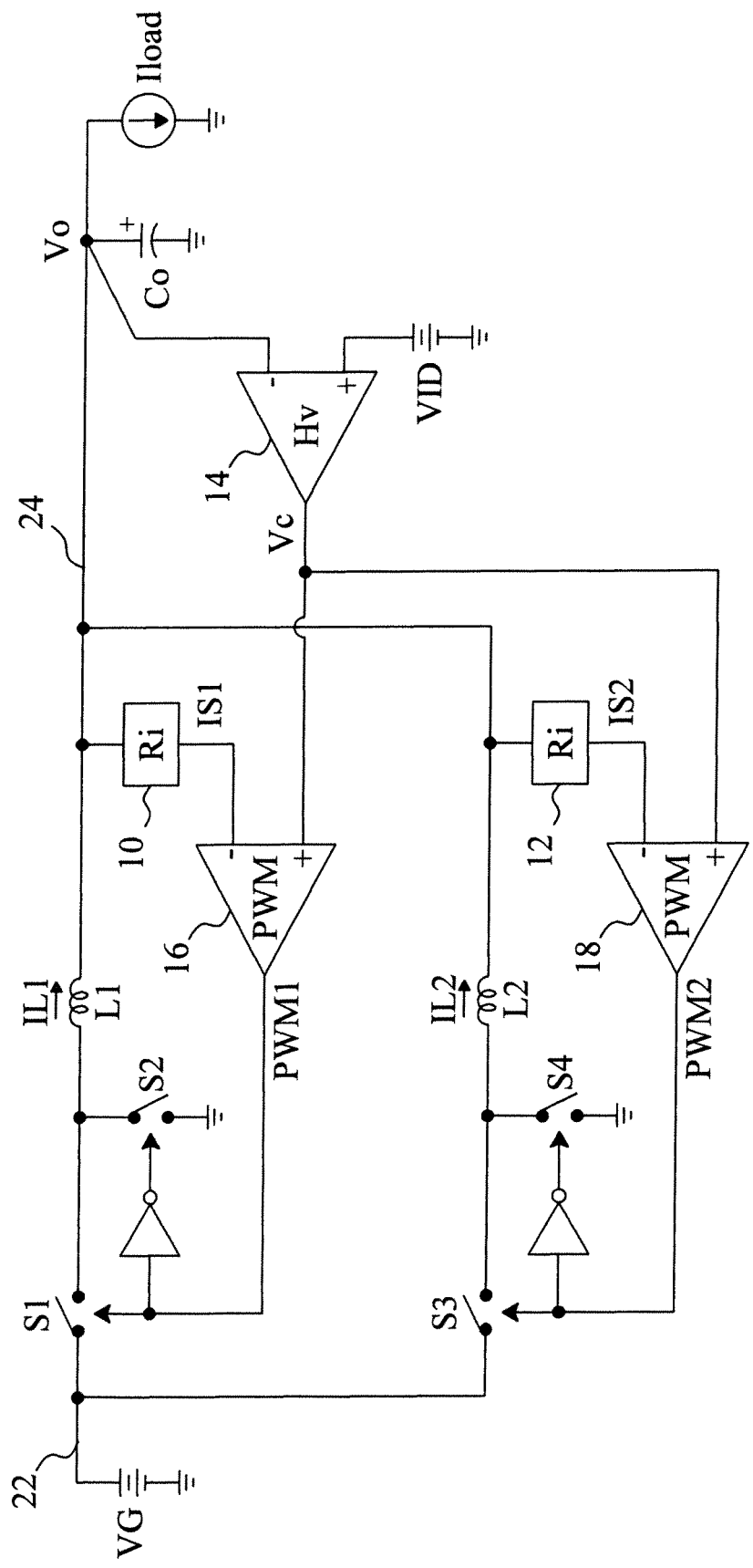
FIG. 2 is a circuit diagram of a two-phase interleaved voltage regulator with peak-current control.
Figure 9:
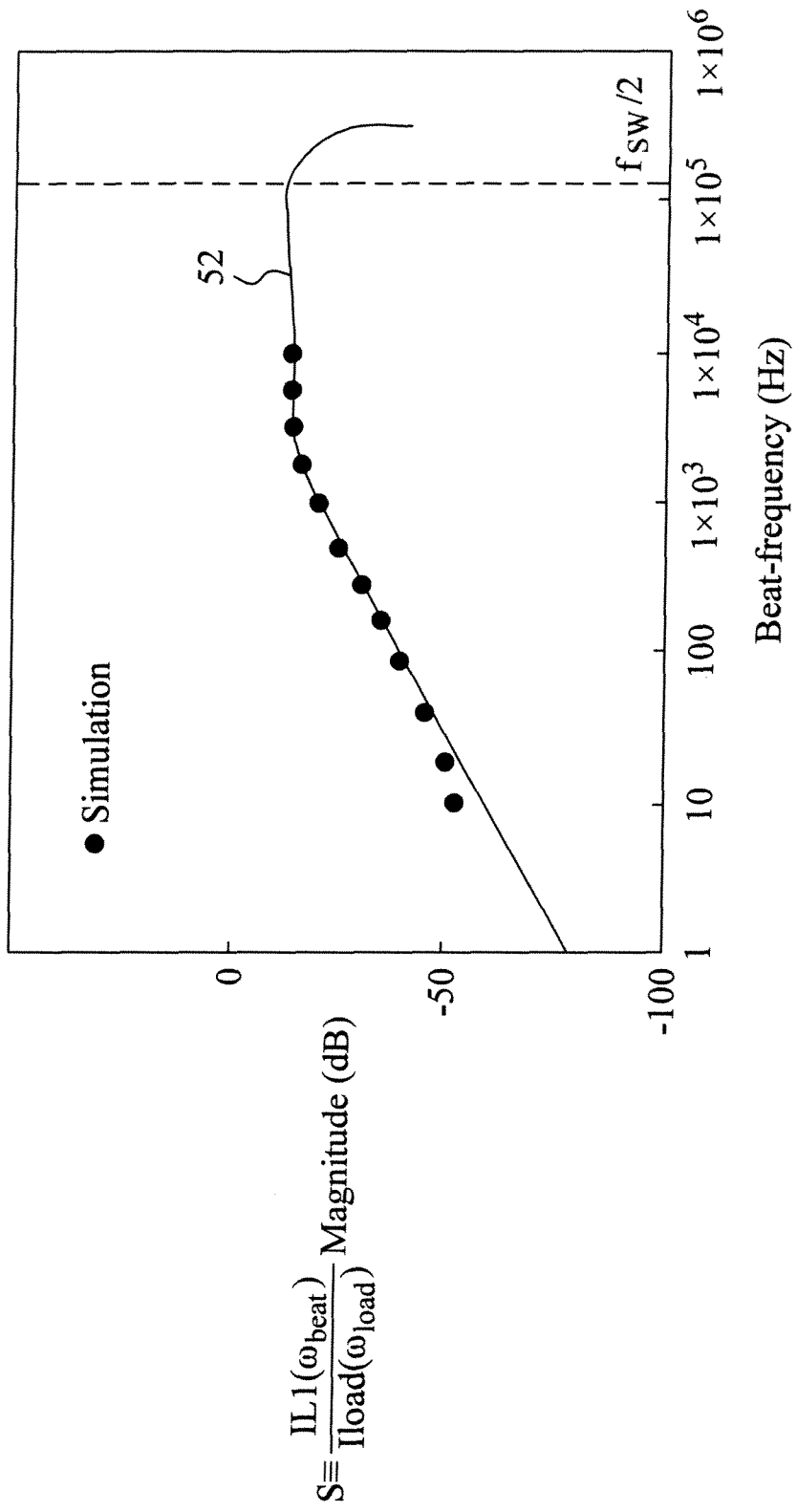
FIG. 9 is the circuit simulation result of the beat-frequency oscillation alleviation in the present invention.
Figure 10:
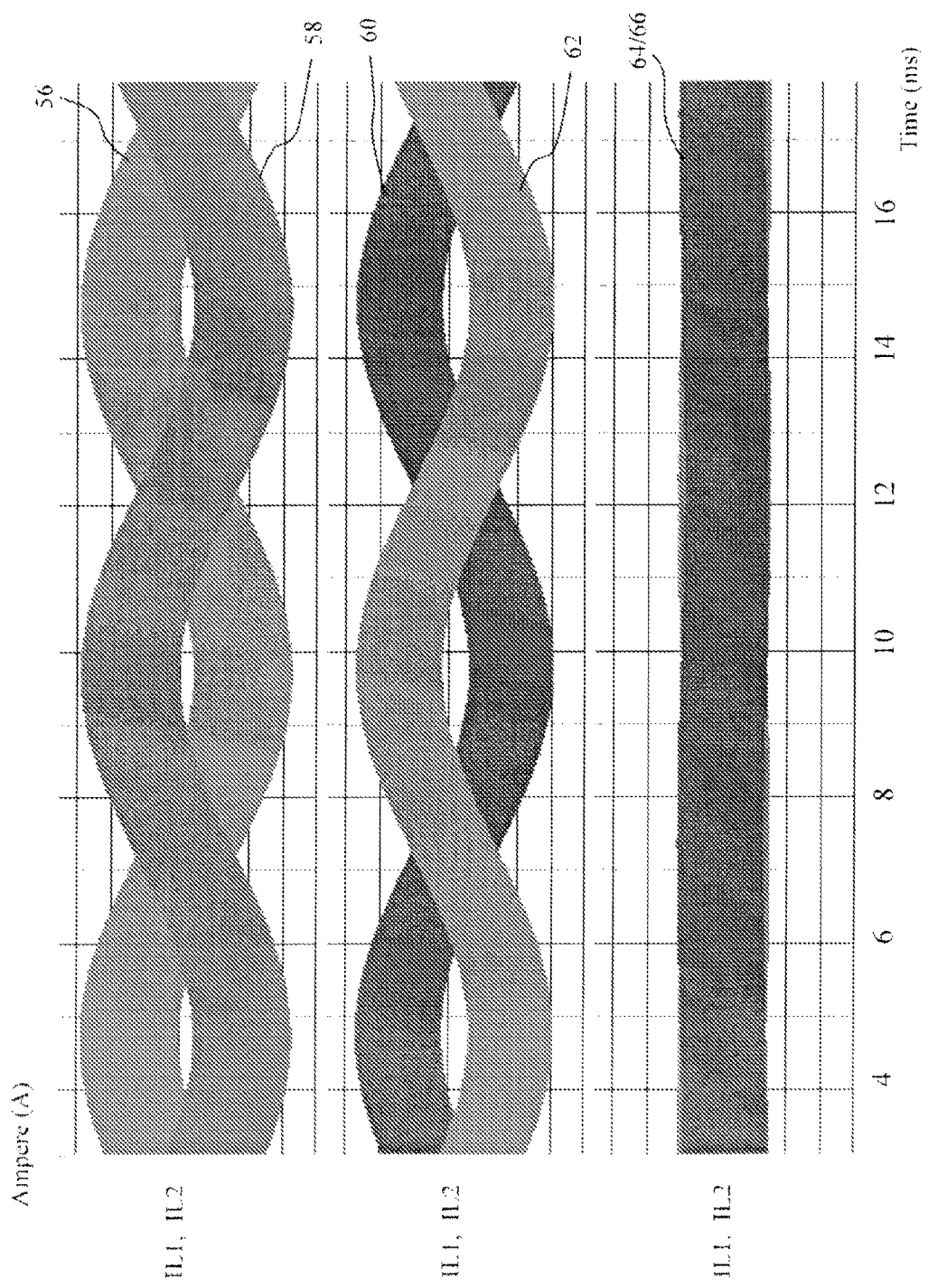
FIG. 10 shows time-domain waveforms of phase currents in a two-phase interleaved voltage regulator when offset cancellation circuit is applied once for all phases and when offset cancellation circuit is applied to each phase separately.

This consequence can be justified by circuit simulation. FIG. 9 shows the simulation result of the beat-frequency oscillation alleviation in the present invention, which shows good match with the model. Time-domain waveforms are shown in FIG. 10, where the load current Iload=0-30 A, the load variation frequency $f_{load}$=299.9 kHz, and the beat-frequency $f_{beat}$=100 Hz, in which waveforms 56 and 58 represent the phase currents IL1 and IL2 under the conventional peak-current control mode (FIG. 2), waveforms 60 and 62 represent the phase currents IL1 and IL2 when an single offset cancellation circuit (FIG. 3) is added, and waveforms 64 and 66 represent the phase currents IL1 and IL2 when a separate offset cancellation circuit is provided for each phase (FIG. 5). The waveforms show that the voltage regulator according to the present invention has less beat-frequency oscillation than the conventional one.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A multiphase interleaved voltage regulator for providing a regulated output voltage at an output terminal thereof, the multiphase interleaved voltage regulator comprising:
   an input terminal receiving an input voltage;
   a compensator in a voltage control loop, coupled to the output terminal, operative to provide a compensation signal; and
   a plurality of phase circuits coupled to the input terminal, the output terminal and the compensator, operative to generate a plurality of interleaved phase currents, each said phase circuit having an offset cancellation circuit for increasing a current loop gain thereof, so as to mitigate beat-frequency oscillation of the phase currents.

2. The multiphase interleaved voltage regulator of claim 1, wherein the compensation signal is proportional to a difference between the output voltage and a reference voltage.

3. The multiphase interleaved voltage regulator of claim 2, wherein each said phase circuit comprises a control circuit for current mode control.

4. The multiphase interleaved voltage regulator of claim 3, wherein each said control circuit generates a pulse-width modulation signal in response to the compensation signal and the phase current of the phase circuit it belongs to so as to realize the current mode control.

5. The multiphase interleaved voltage regulator of claim 4, wherein each said control circuit comprises a pulse-width modulator operative to generate the pulse-width modulation signal for the phase circuit it belongs to.

6. The multiphase interleaved voltage regulator of claim 5, wherein each said offset cancellation circuit provides an offset signal to the pulse-width modulator of the phase circuit it belongs to.

7. The multiphase interleaved voltage regulator of claim 6, wherein each said offset signal is generated in response to the compensation signal and a current sense signal representative of the phase current of the phase circuit it belongs to.

8. The multiphase interleaved voltage regulator of claim 7, wherein each said offset cancellation circuit comprises:
   a first adder coupled to the compensator, adding the offset signal into the compensation signal and subtracting a bias therefrom to generate a modified compensation signal;
   a second adder coupled to the pulse-width modulator, subtracting the current sense signal from the modified compensation signal to generate a difference signal; and
   a low-pass filter coupled to the first and second adders, filtering the difference signal to generate the offset signal.

9. The multiphase interleaved voltage regulator of claim 8, wherein the low-pass filter has a gain greater than one below a frequency, and equal to one above the frequency.

* * * * *

UNITED STATES PATENT AND TRADEMARK OFFICE
CERTIFICATE OF CORRECTION

PATENT NO. : 8,525,497 B2  
APPLICATION NO. : 13/018628  
DATED : September 3, 2013  
INVENTOR(S) : Chen-Hua Chiu et al.

Page 1 of 1

It is certified that error appears in the above-identified patent and that said Letters Patent is hereby corrected as shown below:

TITLE PAGE:

DELETE THE MISSPELLED ASSIGNEE NAME IN ITEM [73] AND INSERT THE CORRECT ASSIGNEE NAME --RICHTEK TECHNOLOGY CORP.--

Signed and Sealed this  
Tenth Day of December, 2013

Margaret A. Focarino  
*Commissioner for Patents of the United States Patent and Trademark Office*